United States Patent
Miller (10) Patent No.: US 11,533,583 B2
(45) Date of Patent: Dec. 20, 2022

(54) AUTOMATED AND DYNAMIC LOCATION IDENTIFICATION AND GEOFENCING BASED ON GPS DATA

(71) Applicant: Omnitracs, LLC, Dallas, TX (US)

(72) Inventor: Ryan Leonard Miller, Chicago, IL (US)

(73) Assignee: Omnitracs, LLC, Dallas, TX (US)

( * ) Notice: Subject to any disclaimer, the term of this patent is extended or adjusted under 35 U.S.C. 154(b) by 0 days.

(21) Appl. No.: 17/175,225

(22) Filed: Feb. 12, 2021

(65) Prior Publication Data

US 2021/0258722 A1 Aug. 19, 2021

Related U.S. Application Data

(60) Provisional application No. 62/976,832, filed on Feb. 14, 2020.

(51) Int. Cl.
*H04W 4/021* (2018.01)
*H04W 64/00* (2009.01)
*G01S 19/24* (2010.01)

(52) U.S. Cl.
CPC .......... *H04W 4/021* (2013.01); *G01S 19/243* (2013.01); *H04W 64/003* (2013.01); *H04W 64/006* (2013.01)

(58) Field of Classification Search
CPC ........ G01S 19/43; G01S 19/071; G01S 19/41; G01S 17/86; G01S 17/42; G01S 19/05; G01S 19/073; G01S 19/42; G01S 19/45; G01S 19/51; G01S 5/0236; G01S 7/4808; G01S 11/06; G01S 13/42; G01S 13/882; G01S 19/52; G01S 5/0036; G01S 5/0054; H04W 4/029; H04W 4/40; H04W 64/00; H04W 4/02; H04W 4/021; H04W 64/006; H04W 4/023; H04W 64/003;
(Continued)

(56) References Cited

U.S. PATENT DOCUMENTS

2007/0288294 A1* 12/2007 Olsen, III .............. G06Q 10/06
 235/385
2014/0258201 A1* 9/2014 Finlow-Bates .......... G06N 5/02
 706/46

(Continued)

*Primary Examiner* — Kwasi Karikari
(74) *Attorney, Agent, or Firm* — ArentFox Schiff (57) ABSTRACT

Aspects of the present disclosure relate to identifying points of interest by generating and storing virtual geofence information that is captured around a physical structure based in part on global positioning system (GPS) data from a plurality of devices that is then processed to identify GPS trajectory and kernel density estimation. Specifically, the techniques include receiving, at the network-based control computer, GPS data from a plurality of devices and grouping the GPS data from the plurality of devices to generate GPS trajectory information for each group of the plurality of devices. Based on the GPS trajectory information, the network-based control computer may calculate kernel density estimation and determine an isoline on a virtual map for the each group of the plurality of devices. By overlaying the isoline data on a geographic coordinate information of a physical structure, the network-based control computer may generate a virtual geofence around the physical structure and store, in a memory, geofence information for the facility.

19 Claims, 8 Drawing Sheets

(58) Field of Classification Search
CPC . H04W 36/0061; H04W 4/026; H04W 4/027; H04W 72/048
See application file for complete search history.

(56) References Cited

U.S. PATENT DOCUMENTS

2016/0239983 A1* 8/2016 Dorum .................... G01C 21/32
2019/0261131 A1* 8/2019 Keil ....................... H04W 68/04
2020/0378780 A1* 12/2020 Beaurepaire ......... G06Q 10/047

* cited by examiner

AUTOMATED AND DYNAMIC LOCATION IDENTIFICATION AND GEOFENCING BASED ON GPS DATA

CROSS-REFERENCE TO RELATED APPLICATION(S)

The application claims benefit of U.S. Provisional Application Ser. No. 62/976,832, entitled "AUTOMATED AND DYNAMIC LOCATION IDENTIFICATION AND GEOFENCING BASED ON GPS DATA," and filed Feb. 14, 2020, which is expressly incorporated by reference herein in its entirety.

BACKGROUND

Aspects of the present disclosure generally relate to image processing, and more particularly to image processing for identifying locations of interest.

Until the $18^{th}$ and $19^{th}$ centuries, most houses and buildings were not numbered. Street naming and numbering began under the age of enlightenment. Numbering allowed people to efficiently receive mail, as the postal system evolved to reach widespread usage. Today, the same postal system of associating locations with unique street addresses of where the person(s) at that address may receive mail continues. This typically correlates to a mail box on the public street closest to a facility (e.g., home, business, or plot of land).

However, identifying a location based simply by the street address may not be ideal or precise for various logistics applications. For example, a location of interest (or "point-of-interest") at a large retail store with significant footprint and multiple entry and exit points may vary for different users and applications. Customer parking, for instance, may be located at the front of the retail store, while the location for deliveries may be located at a completely different part of the facility. Yet, the "street address" for the retail store may not be close to either location if the store is situated in a large multistore complex far from the main street.

Thus, there is a need for improved location identification system that correlates the street address with locations of interest at a facility.

SUMMARY

An example implementation includes a method executable by a network-based control computer, comprising receiving, at the network-based control computer, global positioning system (GPS) data from a plurality of devices. The method further includes grouping the GPS data from the plurality of devices to generate GPS trajectory information for each group of the plurality of devices. Additionally, the method further includes calculating kernel density estimation based on the GPS trajectory information. Additionally, the method further includes determining an isoline on a virtual map for the each group of the plurality of devices based on the kernel density estimation. Additionally, the method further includes overlaying the isoline data on a geographic coordinate information of a physical structure. Additionally, the method further includes generating a virtual geofence around the physical structure based in part on overlaying the isoline data to the geographic coordinate information of the physical structure. Additionally, the method further includes storing, in a memory of the network-based control computer, geofence information for the facility based on the virtual geofence that is created around the physical structure.

Another example implementation includes an apparatus executable by a network-based control computer, comprising a memory and a processor in communication with the memory. The processor is configured to receive, at the network-based control computer, global positioning system (GPS) data from a plurality of devices. The processor is further configured to group the GPS data from the plurality of devices to generate GPS trajectory information for each group of the plurality of devices. Additionally, the processor further configured to calculate kernel density estimation based on the GPS trajectory information. Additionally, the processor further configured to determine an isoline on a virtual map for the each group of the plurality of devices based on the kernel density estimation. Additionally, the processor further configured to overlay the isoline data on a geographic coordinate information of a physical structure. Additionally, the processor further configured to generate a virtual geofence around the physical structure based in part on overlaying the isoline data to the geographic coordinate information of the physical structure. Additionally, the processor further configured to store, in a memory of the network-based control computer, geofence information for the facility based on the virtual geofence that is created around the physical structure.

Another example implementation includes an apparatus executable by a network-based control computer, comprising means for receiving, at the network-based control computer, global positioning system (GPS) data from a plurality of devices. The apparatus further includes means for grouping the GPS data from the plurality of devices to generate GPS trajectory information for each group of the plurality of devices. Additionally, the apparatus further includes means for calculating kernel density estimation based on the GPS trajectory information. Additionally, the apparatus further includes means for determining an isoline on a virtual map for the each group of the plurality of devices based on the kernel density estimation. Additionally, the apparatus further includes means for overlaying the isoline data on a geographic coordinate information of a physical structure. Additionally, the apparatus further includes means for generating a virtual geofence around the physical structure based in part on overlaying the isoline data to the geographic coordinate information of the physical structure. Additionally, the apparatus further includes means for storing, in a memory of the network-based control computer, geofence information for the facility based on the virtual geofence that is created around the physical structure.

Another example implementation includes a computer-readable medium computer-readable medium comprising stored instructions executable by a network-based control computer, executable by a processor to receive, at the network-based control computer, global positioning system (GPS) data from a plurality of devices. The instructions are further executable to group the GPS data from the plurality of devices to generate GPS trajectory information for each group of the plurality of devices. Additionally, the instructions are further executable to calculate kernel density estimation based on the GPS trajectory information. Additionally, the instructions are further executable to determine an isoline on a virtual map for the each group of the plurality of devices based on the kernel density estimation. Additionally, the instructions are further executable to overlay the isoline data on a geographic coordinate information of a physical structure. Additionally, the instructions are further executable to generate a virtual geofence around the physical structure based in part on overlaying the isoline data to the geographic coordinate information of the physical structure. Additionally, the instructions are further executable to store, in a memory of the network-based control computer, geofence information for the facility based on the virtual geofence that is created around the physical structure.

The above presents a simplified summary of one or more aspects of the present disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the present disclosure in a simplified form as a prelude to the more detailed description that is presented later.

To the accomplishment of the foregoing and related ends, the one or more aspects of the present disclosure comprise the features hereinafter fully described and particularly pointed out in the claims. The following description and the annexed drawings set forth in detail certain illustrative features of the one or more aspects of the present disclosure. These features are indicative, however, of but a few of the various ways in which the principles of various aspects of the present disclosure may be employed, and this description is intended to include all such aspects and their equivalents.

BRIEF DESCRIPTION OF THE DRAWINGS

The disclosed aspects of the present disclosure will hereinafter be described in conjunction with the appended drawings, provided to illustrate and not to limit the disclosed aspects, wherein like designations denote like elements, where a dashed line may indicate an optional element or action, and in which.

DETAILED DESCRIPTION

As noted above, identifying a location based simply by the street address may not be ideal or precise for various logistics applications. To this end, aspects of the present disclosure provide image processing techniques to analyze the geospatial image of a geographic area in order to identify locations of interest within the geospatial image for different applications. Specifically, techniques of the present disclosure may identify the geographic coordinate information associated with a street address of a physical structure and retrieve the geospatial image of the geographic area including the physical structure based on the geographic coordinate information. The image processor may then generate a virtual geofence around the physical structure that then allows a network computer to receive and analyze GPS information received from a plurality of devices located within the virtual geofence over a period of time in order to generate locations of interest information for different applications.

In another example, the technique may rely on GPS data from multiple trips to identify GPS trajectories and form a virtual boundary that can further be analyzed based on GPS information to generate locations of interest. For example, one or more techniques may include receiving, at the network-based control computer, global positioning system (GPS) data from a plurality of devices, grouping the GPS data from the plurality of devices to generate GPS trajectory information for each group of the plurality of devices, and calculating kernel density estimation based on the GPS trajectory information. The method may further include determining an isoline on a virtual map for the each group of the plurality of devices based on the kernel density estimation, overlaying the isoline data on a geographic coordinate information of a physical structure, and generating a virtual geofence around the physical structure based in part on overlaying the isoline data to the geographic coordinate information of the physical structure. Once the geofence information is established, the method may include storing, in a memory of the network-based control computer, geofence information for the facility based on the virtual geofence that is created around the physical structure.

Various aspects are now described in more detail with reference to the FIGS. 1-6. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples of implementations of the described system based on the principles described herein, but it should be understood that these examples are not intended to limit the scope of the claims. For instance, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined with other features described in other examples.

Figure 1:
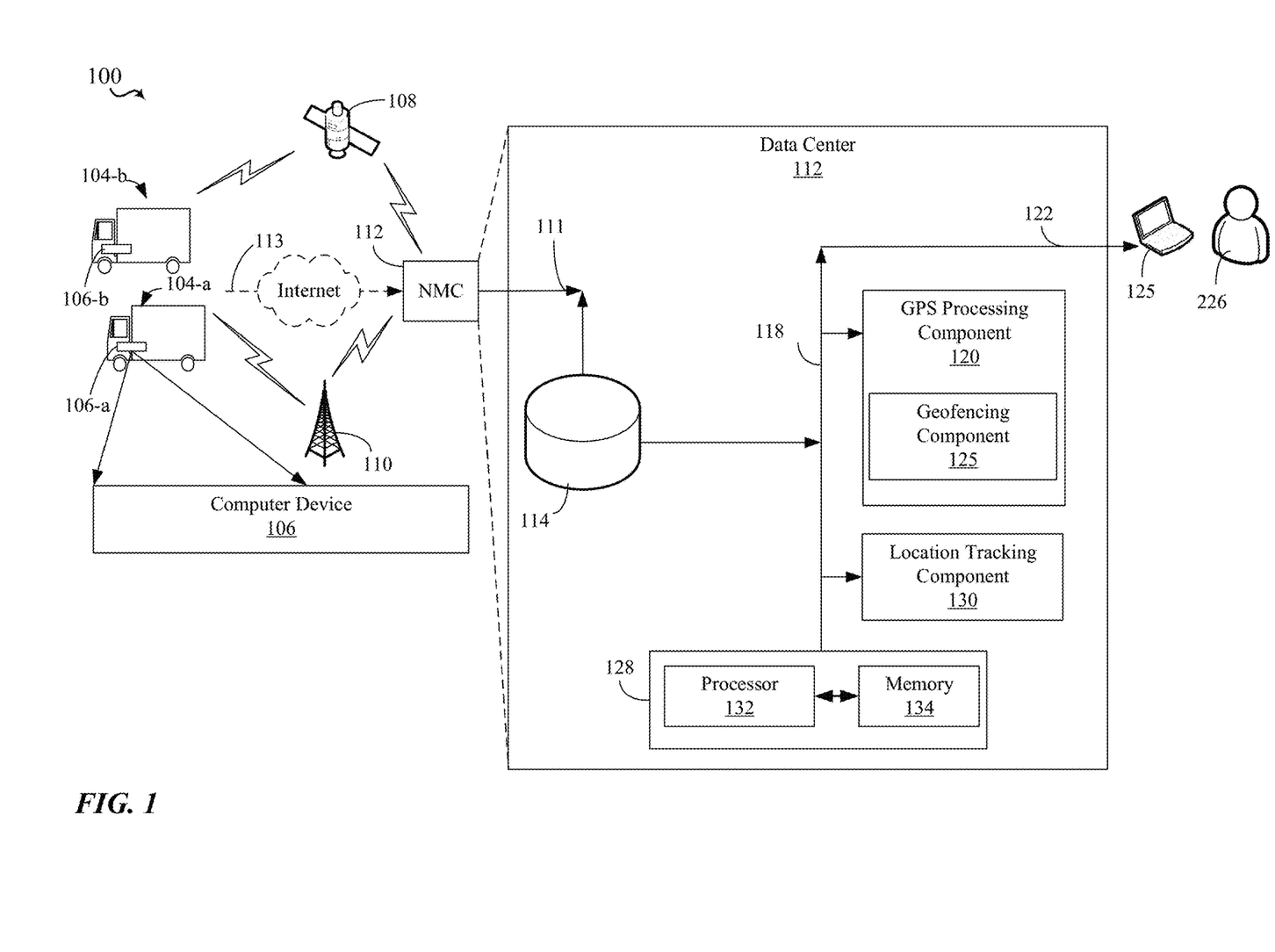
FIG. 1 is a functional block diagram of example elements of a system in accordance with various aspects of the present disclosure.

Referring to FIG. 1, in an aspect, a system 100 includes one or more computer devices, modules, and/or components for controlling vehicles for platooning. As used herein, the terms "module(s)," or "components" may be one of the parts that make up a device, may be hardware or software or firmware, and may be divided into other modules and/or distributed across one or more processors.

In an aspect, system 100 can comprise a network-based control computer (NCC) 112, such as at a network management center, configured to communicate with one or more vehicles 104 via a computer device 106 (e.g., ELD and/or mobile device, etc.) located on each tractor 104 or associated with each driver of each tractor 104. In some systems, the computer device 106 may be more than one device, such as an ELD that may communicate with the mobile device (e.g., a smart phone or an in-cab telematics device). The system 100 may include one or more fleets of vehicles 104. Typically, a fleet could include many tens, hundreds or thousands of vehicles. An example fleet is illustrated as having two vehicles 104. Each computer device 106 may include ELD functionality configured to collect and transmit data associated with the driver to the NCC 112. Also, in some implementations, each computer device 106 and/or its ELD functionality can be configured to perform calculations associated with one or more fleet vehicles using any of the collected data. In some examples, the collected data may include the driver or vehicle data, such as but not limited to one or more of a vehicle identification, a driver identification, the HOS information for the driver, a location of the vehicle 104, and/or telematics information associated with the vehicle 104 and/or driver, which will be collectively referred to as "vehicle information 109." In some examples, telematics is an interdisciplinary field that encompasses telecommunications, vehicular technologies, for instance, road transportation, road safety, electrical engineering (sensors, instrumentation, wireless communications, etc.), and computer science (multimedia, Internet, etc.). To this end, the telematics technology may include transmitting, receiving and storing information (e.g., vehicle and/or driver information) using telecommunication devices to control remote objects such as control one or more applications and aspects of the vehicles (e.g., control the braking and engine of the vehicle).

In an example implementation, the one or more vehicles 104 may be equipped with the computer device 106 in the form of a mobile device in communication with a separate ELD, where the mobile device may function as an in-cab telematics device. In some instances, the mobile device may be a smart phone or tablet configured to receive and process signals and information. In some instances, the ELD may be in communication with the mobile device to allow the collected information to be displayed on the mobile device. To this end, the computer device 106 in the form of either the ELD or the mobile device may include a platooning module 107 to perform one or more functions of the present disclosure, including collecting and transmitting and receiving driver and/or vehicle data to and from a remote NCC 112 and/or configuring the vehicle to participate in a platooning convoy.

In some implementations, the computer device 106 may include a processor configured to execute one or more platooning modules 107 and establish communication with external devices, such as NCC 112, via a communication network (e.g., a terrestrial or satellite-based wireless network). The computer device 106 may also include a memory configured to store computer-readable code that may define all or part of the platooning module 107 and also to store data associated with the module, other components, and/or computer device 106. The computer device 106 may also include a user interface or display, a mobile application server, and a communications module (e.g., including the one or more transceivers, and one or more of terrestrial and Wi-Fi modems, one or more antennae, a GPS and/or satellite communications modem).

As an example only, each vehicle 104 may be in bi-directional communication via the computer device 106 with NCC 112 over at least one communication channel. In the example shown in FIG. 1, each vehicle 104 is in bi-directional communication with the NCC 112 over at least one of a satellite-based communication system 108 or a terrestrial-based system 110 (e.g., a wireless communication system using a communication protocol/technology such as, but not limited to, 5G or New Radio, GSM, CDMA, TDMA, WCDMA, EDGE, OFDM, GPRS, EV-DO, LTE, WiFi, Bluetooth), or, when the vehicle is stopped, via a wired connection 113 through the Internet. In some cases, data may be exchanged with the vehicles 104 using one or both of the satellite communication system 108 and the terrestrial-based communication system 110.

In an aspect, many different types of data are collected and transferred from the vehicles 104 to the NCC 112. Examples of such data include, but are not limited to, vehicle performance data, driver performance data, critical events, messaging and position data, location data, HOS data and many other types of data, which may be collectively referred to as vehicle data 109. All of the information that is communicated to and from the vehicles 104 may be processed via the NCC 112. The NCC 112 can be thought of as a data clearinghouse that receives all data that is transmitted to and received from the vehicles 104. In an aspect, NCC 112 may include one or more back-end servers. Thus, in some aspects, the collected information may periodically (e.g., every x minutes, where x is a whole number, or once a day, or upon availability of a wired or wireless connection) be transmitted from the computer device 106 to the NCC 112 for analysis and record keeping.

In some cases, the system 100 also may include a data center 116, which may be part of or in communication with NCC 112. The data center 116 illustrates one possible implementation of a central repository for all of the data received from each of the vehicles 104. As an example, as mentioned above many different types of data are transmitted from the computer devices 106 associated with each of the vehicles 104 to the NCC 112. In the case where data center 116 is in communication with NCC 112, the data may be transmitted via connection 111 to the data center 116. The connection 111 may comprise any wired or wireless dedicated connection, a broadband connection, or any other communication channel configured to transport the data. Moreover, in an aspect, data center 116 may include one or more back-end servers analyzing the data transmitted from the one or more computer devices 106. Additionally or alternatively, data may also be exchanged between the plurality of computer devices 106 using, for example, peer-to-peer (P2P) communication without the involvement of the NCC 112.

In an aspect, the data center 116 may include a data warehouse 114 for receiving the data from the computer device 106 relating to the vehicle 104. In an aspect, for example, data center 116 may include any number of application servers and data stores, where each may be associated with a separate fleet and/or driver management or performance data. In an aspect, each application server and data store may include a processor, memory including volatile and non-volatile memory, specially-programmed operational software, a communication bus, an input/output mechanism, and other operational systems. For example, an application server may be a services portal (SP) server that receives, for example, messaging and positioning (M/P) data from each of the vehicles 104. Another application server, for example only, may include one or more servers related to safety and compliance, such as a quick deployment center (QDC) server that receives, for example, critical event (CE) data from each of the vehicles 104. Further, for example, another application server may be vehicle and driver performance data related to HOS, fuel usage, and/or cost from each of the vehicles 104. It should be understood that the above list of example servers is for illustrative purposes only, and data center 116 may include additional and/or different application servers.

In some examples, the NCC 112 may include an GPS processing component 120 for processing geospatial image of a geographic area that includes a physical structure at a specified geographic coordinates. In some examples, the geofencing component 125 may generate a virtual geofence around the physical structure by leveraging GPS data received from one or more devices that track the GPS trajectory (or vector). Specifically, a GPS processing component 120 may rely on GPS data from multiple trips to identify GPS trajectories and form a virtual boundary that can further e analyzed based on GPS information to generate locations of interest. For example, one or more techniques may include receiving, at the network-based control computer, global positioning system (GPS) data from a plurality of devices, grouping the GPS data from the plurality of devices to generate GPS trajectory information for each group of the plurality of devices, and calculating kernel density estimation based on the GPS trajectory information. The method may further include determining an isoline on a virtual map for the each group of the plurality of devices based on the kernel density estimation, overlaying the isoline data on a geographic coordinate information of a physical structure, and generating a virtual geofence around the physical structure based in part on overlaying the isoline data to the geographic coordinate information of the physical structure. Once the geofence information is established, the method may include storing, in a memory of the network-based control computer, geofence information for the facility based on the virtual geofence that is created around the physical structure.

Once the virtual geofence has been established, the location tracking component 130 may receive and analyze GPS information (e.g., GPS "pings") received from a plurality of devices (e.g., computer devices 106 configured to provide location information such as GPS tracking devices or mobile phones, etc.) located within the virtual geofence over a period of time in order to generate locations of interest information for different applications by tracking the density of the GPS clusters. For instance, within the established virtual geofence, the location tracking component 130 may track the location of passenger vehicles or delivery trucks over time to determine the precise location around the physical structure where the devices tend to remain stationary for extended periods of time. Such information would then allow location tracking component 130 to differentiate location of interests for each application (e.g., for logistics applications the location of delivery parking as opposed to customer parking areas etc.).

In some aspect, the NCC 112 may further communicate with a terminal device 125, which can be a user interface portal, a web-based interface, a personal computer (PC), a laptop, a personal data assistant (PDA), a smart phone, a dedicated terminal, a dumb terminal, or any other device over which a user 126, such as a manager or operator responsible for monitoring a fleet of vehicles 104, may communicate.

In an aspect, the NCC 112 and/or the data center 116 may include a processor 132 and a memory 134 to respectively execute and store instructions and data associated the operation of the data center 116, such as to operate the GPS processing component 120 and the location tracking component 130. Although shown as residing within the data center 116, the analysis engine may reside elsewhere, and may be implemented as a distributed system in which the processor 132 and the memory 134 may include one or more processor and memories, and may be located in different places, such as at NCC 112 and/or one or more servers associated with NCC 112 or data center.

Figure 2A:
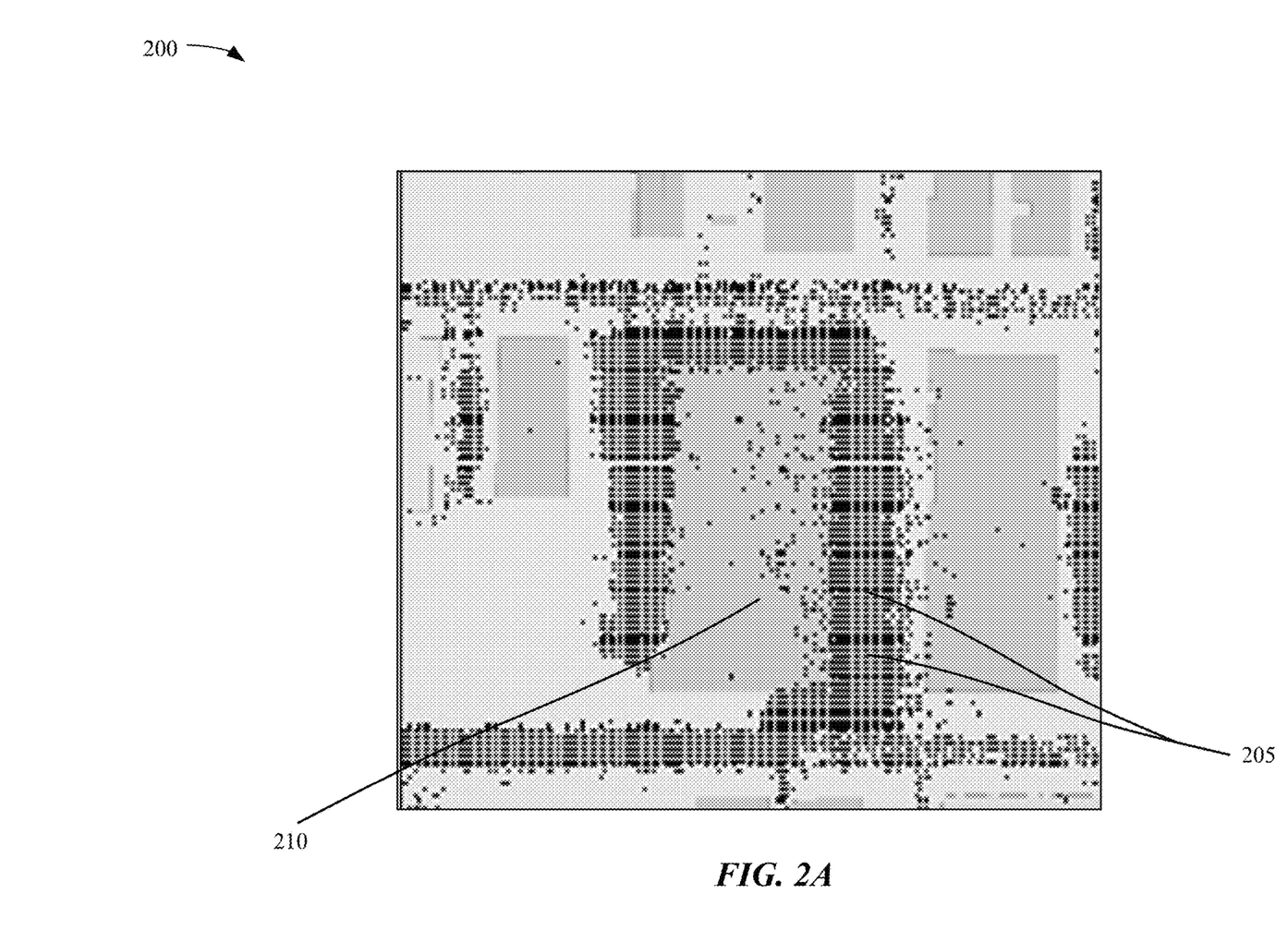
FIGS. 2A and 2B are examples of data extraction and processing that associates GPS paths to building footprint based on clustering of vehicle path and nearest building in accordance with various aspects of the present disclosure.
Figure 2B:
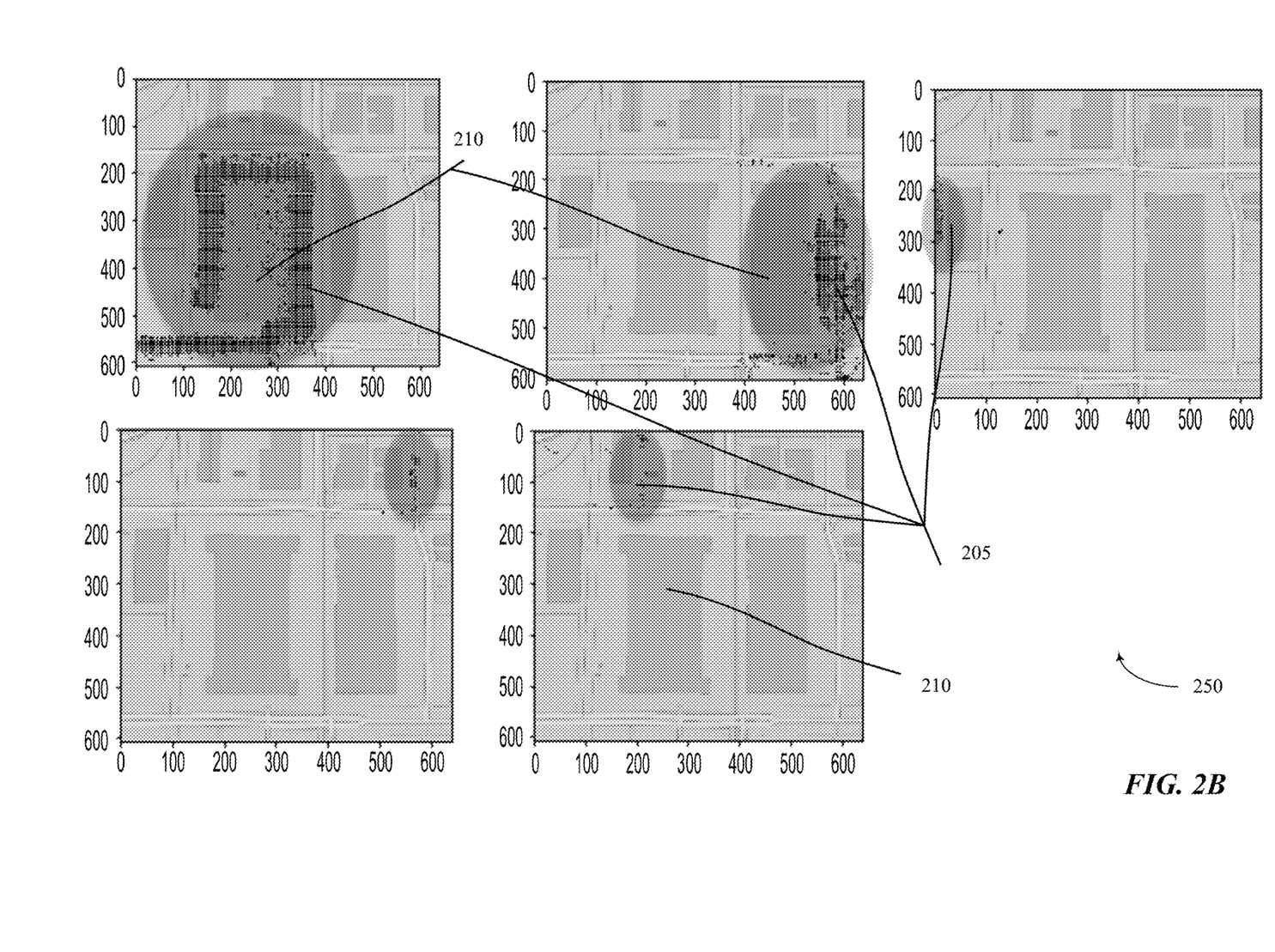

FIGS. 2A and 2B are examples 200 and 250 of data extraction and processing that associates GPS pings 205 to building footprint based on clustering of vehicle path and nearest building in accordance with various aspects of the present disclosure. In some examples, the network-based control computer may receive one or more GPS information (e.g., GPS pings 205 that are reflected in black dots in FIGS. 2A and 2B) from a plurality of devices that may be located around a physical structure 210 (e.g., building).

The network-based control computer may monitor and identify locations of the cluster of GPS "pings" 205 that are stationary at specified locations (e.g., measuring the density of GPS pings at a location over time) over a period of time (e.g., 24 hours, one week, month etc.). Based in part on the received GPS information, the computer device 106 may deduce the location of the GPS device emitting the pings and determine the GPS device may be located within a vehicle that is parked. As such, over time, network-based control computer may develop historical data and identify one or more locations of interest within the virtual geofence that are associated with the physical structure. More specifically, the network-based control computer may group the GPS data from the plurality of devices to generate GPS trajectory information for each group of the plurality of devices.

Figure 3A:
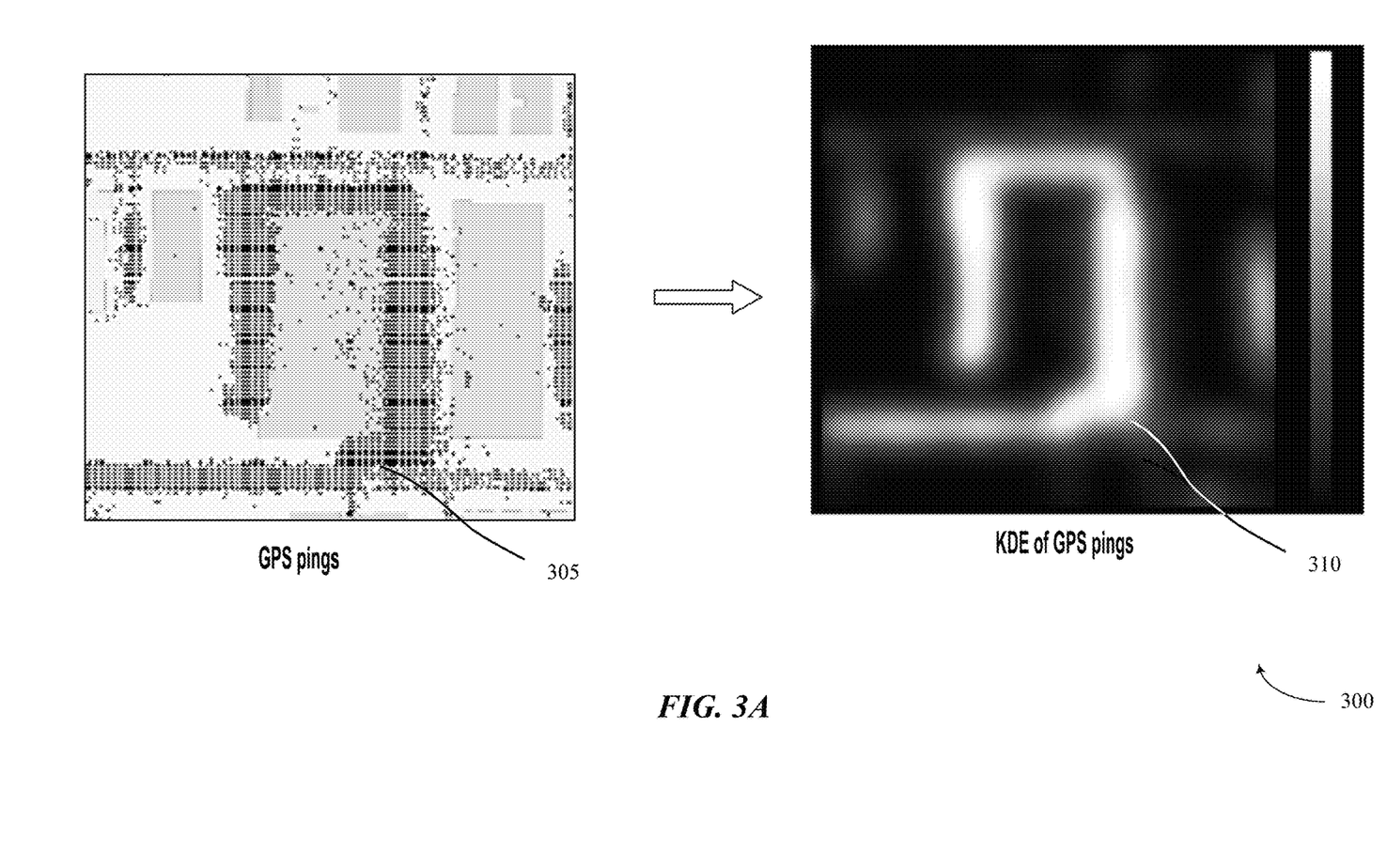
FIGS. 3A and 3B are examples image processing for facilitating identification of location of interest in accordance with aspects of the present disclosure.
Figure 3B:
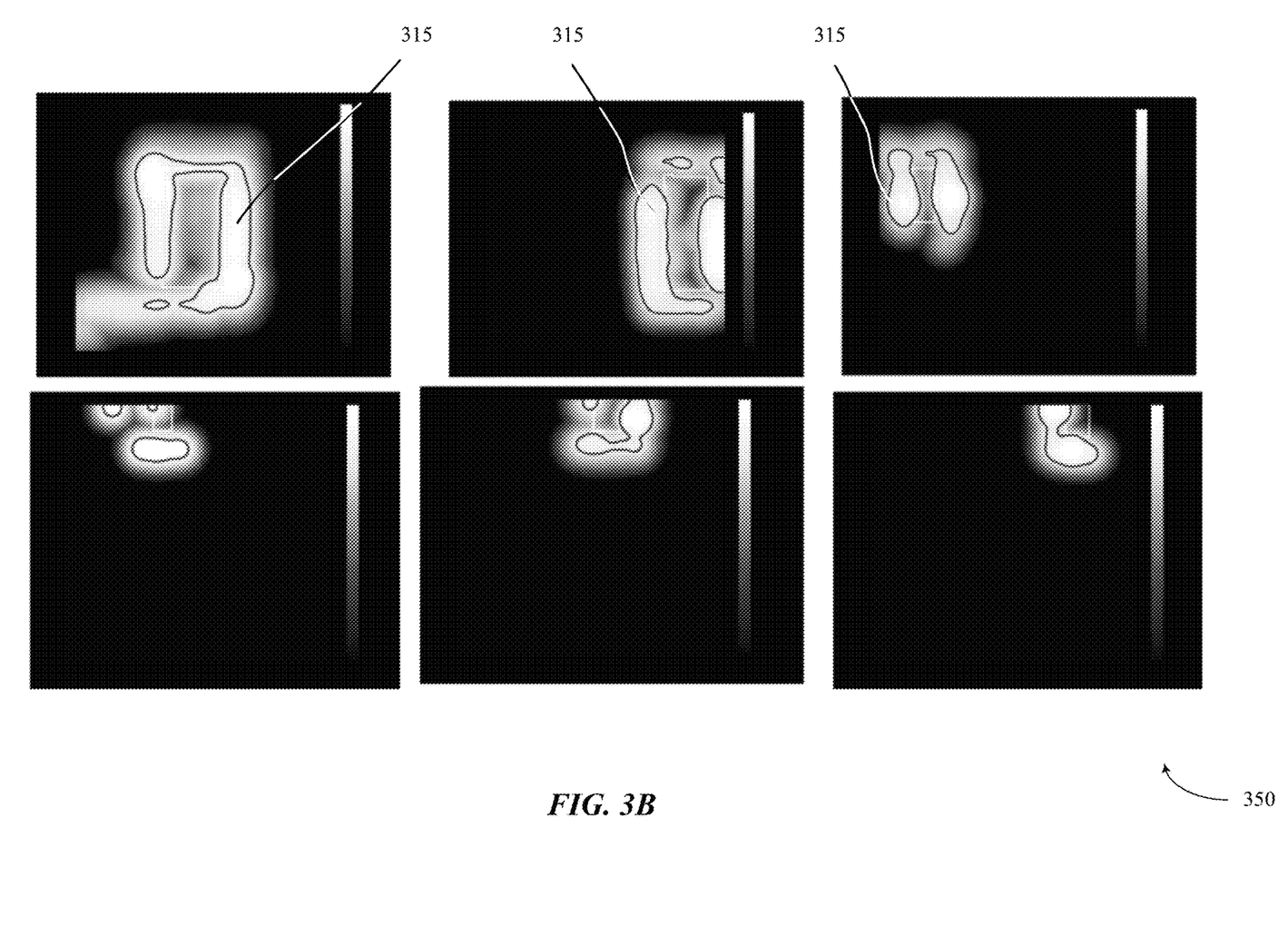

FIGS. 3A and 3B are examples image processing 300 and 350 for facilitating identification of location of interest in accordance with aspects of the present disclosure. Once the network-based control computer has grouped the GPS data from the plurality of devices to generate GPS trajectory information 305 for each group of the plurality of devices, the network-based control computer may calculate kernel density estimation 310 based on the GPS trajectory information 305. Kernel density estimation (KDE) is a non-parametric way to estimate the probability density function of a random variable such as the GPS pings. Kernel density estimation may allow for data smoothing where inferences about the GPS information that is grouped are made, based on a finite data sample.

Once the KDE 310 of the GPS pings is calculated, the network-based control computer may determine an isoline 315 as illustrated in FIG. 3B on a virtual map for the each group of the plurality of devices. For purposes of the present disclosure, the term isoline may refer to isoline map that may present numerical data cartographically to recognize geographical patterns and relationships. Therefore, isolines 315 are lines drawn on maps connecting data points of the value associated with the GPS pings 205 that are grouped together to form the GPS trajectory.

Figure 4:
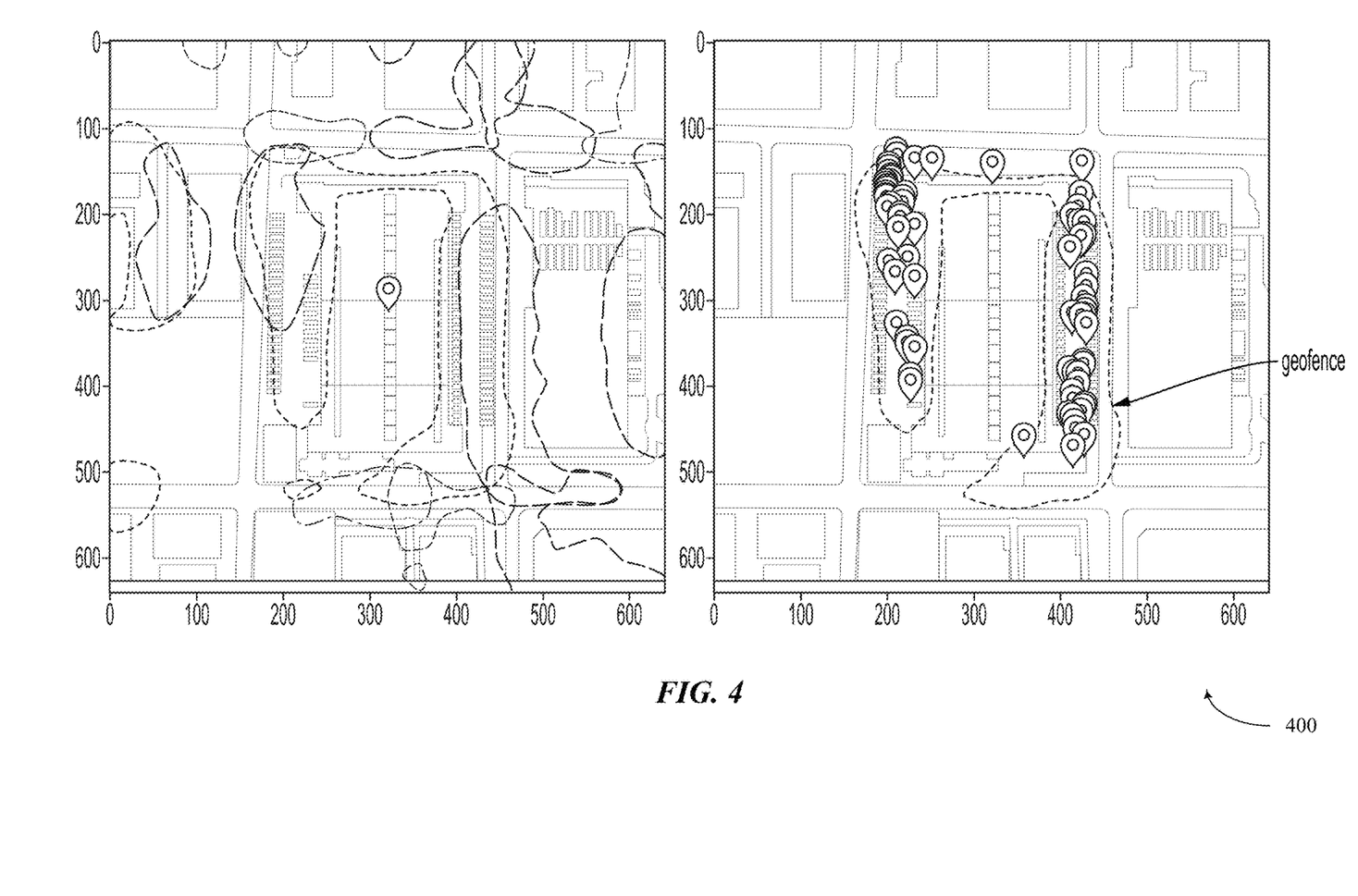
FIG. 4 is an example of conducting kernel density estimation for each group of GPS trajectories in accordance with aspects of the present disclosure.

In some aspects, the network-based control computer may then overlay the isoline data 315 on a geographic coordinate information of a physical structure as reflected in FIG. 4 and generate a virtual geofence around the physical structure. Additionally, the method further includes storing, in a memory of the network-based control computer, geofence information for the facility based on the virtual geofence that is created around the physical structure.

FIG. 4 is an example of conducting kernel density estimation for each group of GPS trajectories in accordance with aspects of the present disclosure. In some examples, the NCC 112, and more particularly the location tracking component 130, utilizing the virtual geofence information that is generated for the one or more physical structures to then receive and process GPS information received from a plurality of devices located within the virtual geofence over a period of time in order to generate locations of interest information for different applications.

Specifically, as illustrated in FIG. 4, the location tracking component 130 may receive GPS "pings" from one or more devices (e.g., computer device 106) capable of transmitting or broadcasting location information to the NCC 112. Over a period of time, the location tracking component 130 may monitor and identify locations of the cluster of GPS "pings" that are stationary at specified locations (e.g., measuring the density of GPS pings at a location over time), and thereby allow the location tracking component 130 to deduce that the computer device 106 that may be located within a vehicle that is parked. As such, over time, the location tracking component 130 may be able to develop historical data and identify one or more locations of interest within the virtual geofence that are associated with the physical structure.

The information generated by the location tracking component 130 based on the virtual geofence may be used in practical logistics applications including, for example, identifying a location of interest at the physical structure that is within the virtual geofence. The location of interest includes docking stations or parking spaces tailored to accommodate trucks or other vehicles and configuring a vehicle 104 to display the location of interest on a display screen located within the vehicle 104 (e.g., on the computer device 106). The system may also allow for generating a notice when a GPS data associated with a device (e.g., computer device 106) indicates that the device has either entered or exited the virtual geofence around the physical structure. The notice may include a message indicating that the device has arrived or departed the physical structure, and transmitting the notice to a remote computer identifying when the device has entered or exited the physical structure.

Additionally or alternatively, other practical applications may include detecting that a device (e.g., computer device 106), in route to the physical structure, is within a predetermined distance of the virtual geofence around the physical structure based on a GPS data associated with the device. The detection may trigger the computer device 106 or the NCC 112 to generate a notice indicating that the device will be arriving at the physical structure within a specified time period based on detecting that the device is within the predetermined distance of the virtual geofence. The computer device 106 or the NCC 112 may transmit the notice to a remote dispatcher prior to arrival at the physical structure.

Figure 5:
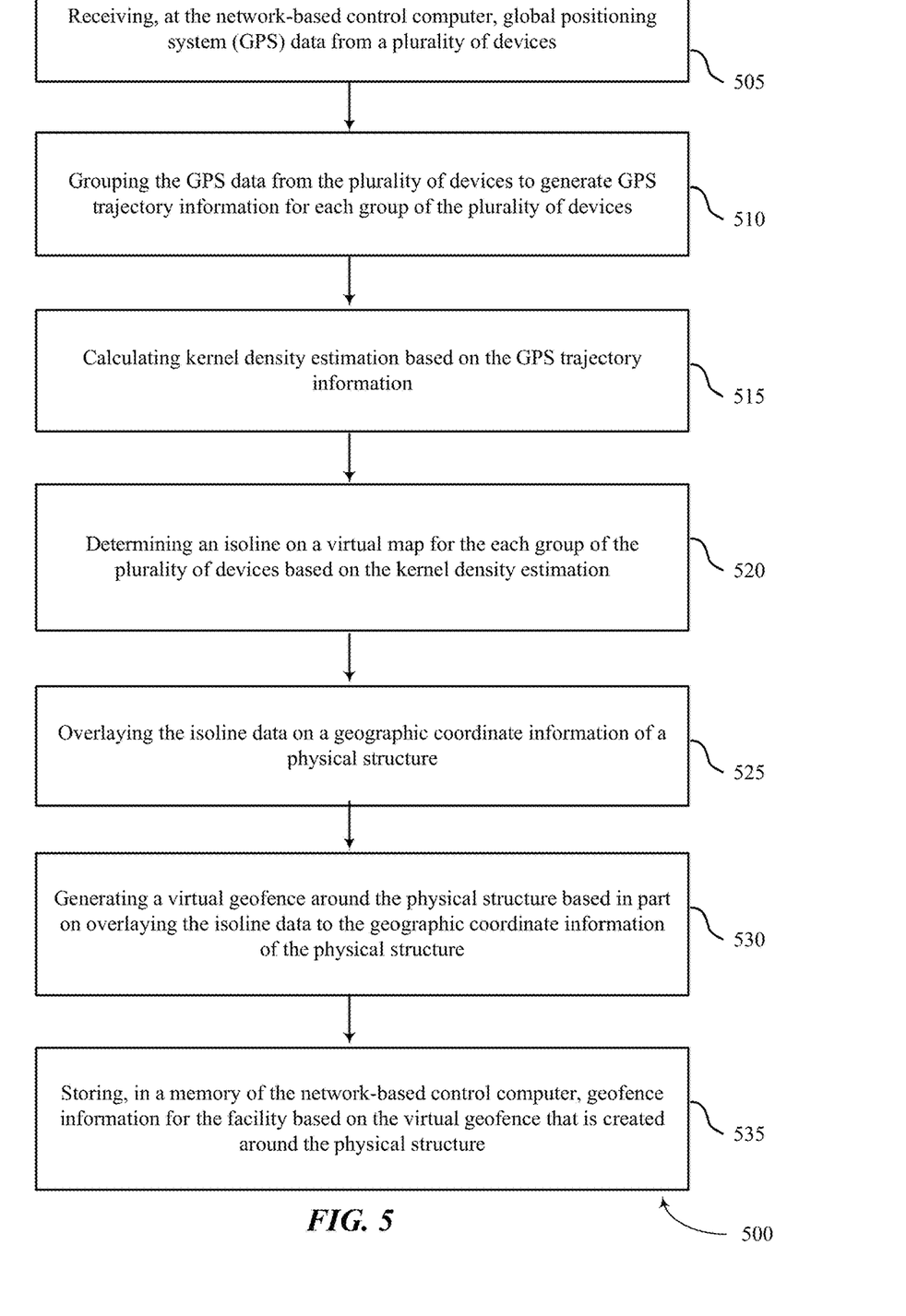
FIG. 5 is a flowchart of an example method for image processing for identification of location of interest in accordance with various aspects of the present disclosure.

Referring to FIG. 5, one example of a method 500 for data processing to identify locations of interest in accordance with various aspects of the present disclosure may be performed by the NCC 112 discussed with reference to FIG. 1. In some examples, the method 500 may be performed by a processor (e.g., processor 132 with reference to FIGS. 1 and 6), such as by executing instructions stored in the memory (e.g., memory 134 with reference to FIGS. 1 and 6). It should be appreciated that the below identified operation of the method 500 is just one example to identify locations of interests. Indeed, the method 500 may be modified to change an order in which the steps are performed.

At block 505, the method 500 may include receiving, at the network-based control computer, global positioning system (GPS) data from a plurality of devices. The geographic coordinates associated with the street address may include longitude and latitude coordinates of the physical structure. Additionally, the physical structure may be a warehouse, a shipping physical structure, or a physical location that includes access for trucks or large vehicles (e.g., semi-trucks, delivery trucks or vans etc.). Aspects of block 505 may be performed by the communications component 615 and the location tracking component 130 described with reference to FIGS. 1 and 6.

At block 510, the method 500 may include grouping the GPS data from the plurality of devices to generate GPS trajectory information for each group of the plurality of devices. Aspects of block 510 may be performed by the GPS processing component 120 described with reference to FIGS. 1 and 6.

At block 515, the method 500 may include calculating kernel density estimation based on the GPS trajectory information. In some examples, processing the geospatial image to extract the first boundary outline of the physical structure may comprise applying a computer vision function to the geospatial image to remove background noise from the geospatial image, and detecting boundary edges of the physical structure by analyzing the geospatial image absent the background noise. Thus, processing of the geospatial image may include determining the first boundary outline based on the boundary edges. Aspects of block 515 may be performed by the GPS processing component 120 described with reference to FIGS. 1 and 6.

At block 520, the method 500 may include determining an isoline on a virtual map for the each group of the plurality of devices based on the kernel density estimation. Aspects of block 520 may be performed by the GPS processing component 120 and the geofencing component 125 described with reference to FIGS. 1 and 6.

At block 525, the method 500 may include overlaying the isoline data on a geographic coordinate information of a physical structure. Aspects of block 525 may be performed by the geofencing component 125 described with reference to FIGS. 1 and 6.

At block 530, the method 500 may include generating a virtual geofence around the physical structure based in part on overlaying the isoline data to the geographic coordinate information of the physical structure. Aspects of block 530 may be performed by the GPS processing component 120 and the geofencing component 125 described with reference to FIGS. 1 and 6.

At block 535, the method 500 may include storing, in a memory of the network-based control computer, geofence information for the facility based on the virtual geofence that is created around the physical structure. In some examples, once the virtual geofence is stored, the method 500 may include identifying a location of interest at the physical structure that is within the virtual geofence. The location of interest may include docking stations or parking spaces tailored to accommodate trucks, and configuring a vehicle to display the location of interest on a display screen located within the vehicle. The method may also include generating a notice when a GPS data associated with a device indicates that the device has either entered or exited the virtual geofence around the physical structure. The notice may include a message indicating that the device has arrived or departed the physical structure, and transmitting the notice to a remote computer identifying when the device has entered or exited the physical structure. In some examples, the method may include identifying a location of interest at the physical structure that is within the virtual geofence based on accumulation of the GPS data from the plurality of devices over a first period of time, and configuring a GPS device to display the location of interest on a display screen.

Additionally or alternatively, the virtual geofence information may be used to detect when a device, in route to the physical structure, is within a predetermined distance of the virtual geofence around the physical structure based on a GPS data associated with the device. The method may include generating a notice indicating that the device will be arriving at the physical structure based on detecting that the device is within the predetermined distance of the virtual geofence, and transmitting the notice to a remote dispatcher prior to arrival at the physical structure. Aspects of block 530 may be performed by the GPS processing component 120, the location tracking component 130, and the processor 132 described with reference to FIGS. 1 and 6.

Figure 6:
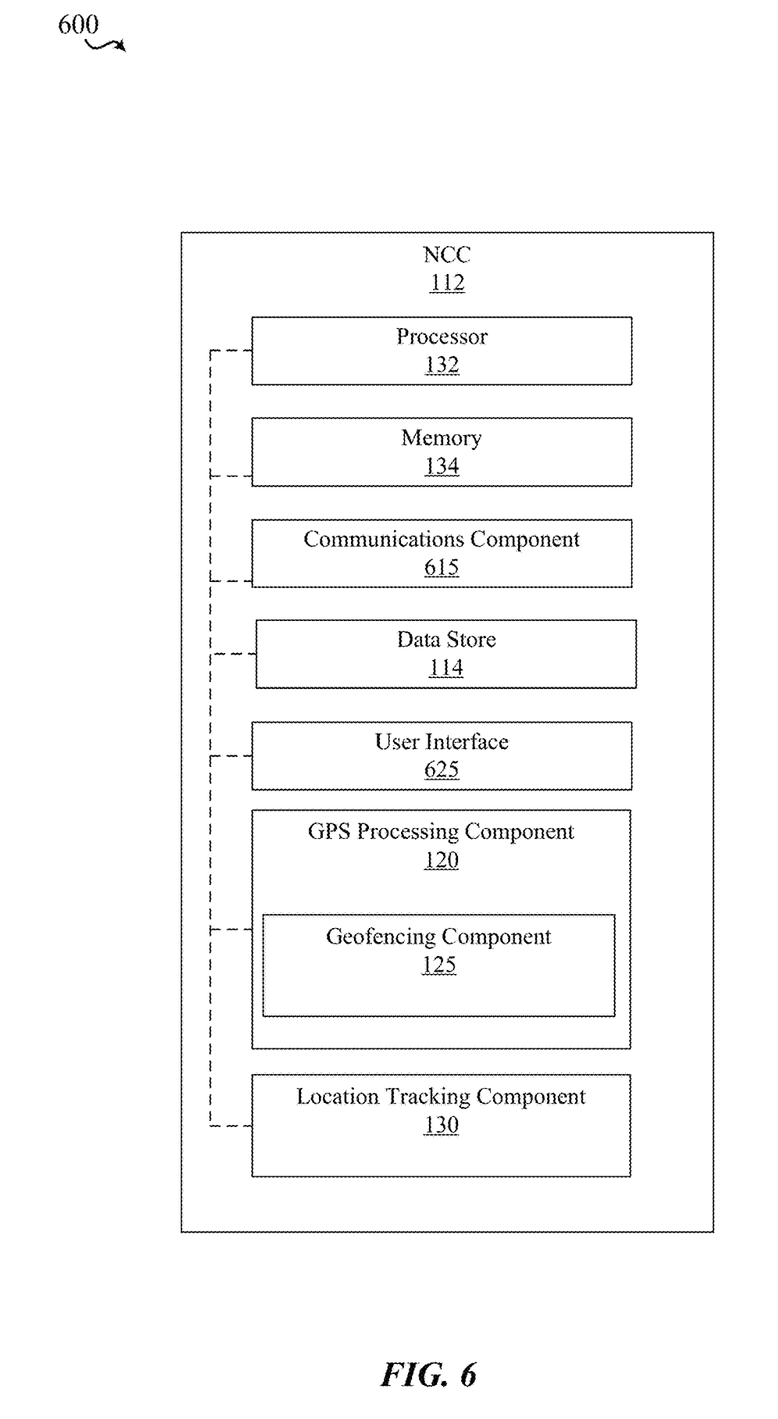
FIG. 6 is a block diagram of an example network computer device in accordance with the present disclosure.

Referring to FIG. 6, in an example that should not be construed as limiting, the NCC 112, may include additional components that operate in conjunction with the GPS processing component 120 and the location tracking component 130, and may be implemented in specially programmed computer readable instructions or code, firmware, hardware, or some combination thereof.

In an aspect, for example, features described herein with respect to the functions of the GPS processing component 120 and the location tracking component 130 may be implemented in or executed using one or any combination of processor 132, memory 134, communications module 615, and data store 114. For example, GPS processing component 120 and the location tracking component 130 may be defined or otherwise programmed as one or more processor modules of processor 132. Further, for example, GPS processing component 120 and the location tracking component 130 may be defined as a computer-readable medium (e.g., a non-transitory computer-readable medium) stored in memory 134 and/or data store 114 and executed by processor 132. Moreover, for example, inputs and outputs relating to operations of GPS processing component 120 and the location tracking component 130 may be provided or supported by communications module 615, which may provide a bus between the modules of NCC 112 or an interface for communication with external devices or modules.

Processor 132 can include a single or multiple set of processors or multi-core processors. Moreover, processor 132 can be implemented as an integrated processing system and/or a distributed processing system. Memory 134 may operate to allow storing and retrieval of data used herein and/or local versions of applications and/or software and/or instructions or code being executed by processor 132, such as to perform the respective functions of platooning management module 120 described herein. Memory 134 can include any type of memory usable by a computer, such as random access memory (RAM), read only memory (ROM), tapes, magnetic discs, optical discs, volatile memory, non-volatile memory, and any combination thereof.

Communications module 615 is operable to establish and maintain communications with one or more internal components/modules or external devices utilizing hardware, software, and services as described herein. Communications component 615 may carry communications between modules on NCC 112, as well as between user and external devices, such as devices located across a communications network and/or devices serially or locally connected to NCC 112. For example, communications component 615 may include one or more buses, and may further include transmit chain modules and receive chain modules associated with a transmitter and receiver, respectively, or a transceiver, operable for interfacing with external devices.

Additionally, data store 114, which can be any suitable combination of hardware and/or software, which provides for mass storage of information, databases, and programs employed in connection with aspects described herein. For example, data store 114 may be a data repository for applications not currently being executed by processor 132.

The NCC 112 may additionally include a user interface module 625 operable to receive inputs from a user, and further operable to generate outputs for presentation to the user. User interface module 625 may include one or more input devices, including but not limited to a keyboard, a number pad, a mouse, a touch-sensitive display, a navigation key, a function key, a microphone, a voice recognition module, any other mechanism capable of receiving an input from a user, or any combination thereof. Further, user interface module 625 may include one or more output devices, including but not limited to a display, a speaker, a haptic feedback mechanism, a printer, any other mechanism capable of presenting an output to a user, or any combination thereof.

The NCC 112 may also include an GPS processing component 120 for processing geospatial image of a geographic area that includes a physical structure at a specified geographic coordinates. In some examples, the geofencing component 125 may generate a virtual geofence around the physical structure by leveraging the GPS processing component 120. Specifically, an GPS processing component 120 may receive geographic coordinate information associated with a street address of a physical structure and retrieve, from a database (e.g., data warehouse 114), a geospatial image of a geographic area including the physical structure based on the geographic coordinate information. Once the geospatial image of the geographic area has been retrieved, the GPS processing component 120 may apply computer vision function to the geospatial image to remove background noise (e.g., trees, streets, etc.) from the geospatial image and detect the boundary edges of the physical structure by analyzing the geospatial image absent the background noise.

Once the GPS processing component 120 identifies the boundary edges of the physical structure, the geofencing component 125 may extract a first boundary outline of the physical structure for virtual geofencing. Subsequently, the geofencing component 125 may calculate a second boundary outline offset outside of the first boundary line based on an offset value. The offset value may be variable or a fixed parameter. For example, the geofencing component 125 may determine a first set of latitude and longitude coordinates for a first plurality of geographic points of the first boundary outline, and identify a second set of latitude and longitude coordinates for a second plurality of geographic points by stepping out and away from each of the first set of latitude and longitude coordinates by a geographic distance defined by the offset value. Thus, the geofencing component 125 may determine the second boundary outline based on the second set of latitude and longitude coordinates.

In another example, the geofencing component 125 in collaboration with GPS processing component 120 may determine a first set of latitude and longitude coordinates for a first plurality of geographic points of the first boundary outline and convert the first set of latitude and longitude coordinates into a first set of pixel space coordinates for a first plurality of pixels of the first boundary outline. The geofencing component 125 and GPS processing component 120 may also identify a second set of pixel space coordinates for a second plurality of pixels by stepping out and away from each of the first set of pixel space coordinates by a pixel space distance defined by the offset value. Again, as noted above, the offset value may be variable (e.g., depending on location) or fixed offset value. The GPS processing component 120 may then convert the second set of pixel space coordinates into a second set of latitude and longitude coordinates for a second plurality of geographic points, and determine the second boundary outline based on the second set of latitude and longitude coordinates.

The second boundary outline may then be utilized by the geofencing component 125 as the basis for generating a virtual geofence around a physical structure (e.g., warehouse, a shipping physical structure, or a physical location that includes access for vehicles). Once the virtual geofence has been established, the location tracking component 130 may receive and analyze GPS information (e.g., GPS "pings") received from a plurality of devices (e.g., computer devices 106 configured to provide location information such as GPS tracking devices or mobile phones, etc.) located within the virtual geofence over a period of time in order to generate locations of interest information for different applications by tracking the density of the GPS clusters. For instance, within the established virtual geofence, the location tracking component 130 may track the location of passenger vehicles or delivery trucks over time to determine the precise location around the physical structure where the devices tend to remain stationary for extended periods of time. Such information would then allow location tracking component 130 to differentiate location of interests for each application (e.g., for logistics applications the location of delivery parking as opposed to customer parking areas etc.).

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. 1-6 which may illustrate various process flows.

As used in this description, the terms "module," "components," "database," "module," "system," and the like are intended to refer to a computer-related entity, either hardware, firmware, a combination of hardware and software, software, or software in execution. For example, a module may be, but is not limited to being, a process running on a processor, a processor, an object, an executable, a thread of execution, a program, and/or a computer. By way of illustration, both an application running on a computing device and the computing device may be a module. One or more modules may reside within a process and/or thread of execution, and a module may be localized on one computer and/or distributed between two or more computers. In addition, these modules may execute from various computer readable media having various data structures stored thereon. The modules may communicate by way of local and/or remote processes such as in accordance with a signal having one or more data packets (e.g., data from one module interacting with another module in a local system, distributed system, and/or across a network such as the Internet with other systems by way of the signal).

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc ("CD"), laser disc, optical disc, digital versatile disc ("DVD"), floppy disk and blue-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method executable by a network-based control computer, comprising:
    receiving, at the network-based control computer, global positioning system (GPS) data from a plurality of devices, wherein the GPS data is associated with a physical structure;
    grouping the GPS data from the plurality of devices to generate GPS trajectory information for each group of the plurality of devices;
    calculating kernel density estimation based on the GPS trajectory information;
    determining an isoline on a virtual map for the each group of the plurality of devices based on the kernel density estimation;
    overlaying the isoline data on a geographic coordinate information of the physical structure;
    generating a virtual geofence around the physical structure based in part on overlaying the isoline data to the geographic coordinate information of the physical structure; and
    storing, in a memory of the network-based control computer, geofence information for a facility based on the virtual geofence that is created around the physical structure,
    wherein the physical structure is a warehouse, a shipping physical structure, or a physical location that includes access for vehicles.

2. The method of claim 1, further comprising:
    identifying a location of interest at the physical structure that is within the virtual geofence based on accumulation of the GPS data from the plurality of devices over a first period of time.

3. The method of claim 2, further comprising:
    configuring a GPS device to display the location of interest on a display screen.

4. The method of claim 1, further comprising:
    generating a notice when a global positioning system (GPS) data associated with a device indicates that the device has either entered or exited the virtual geofence around the physical structure, wherein the notice includes a message indicating that the device has arrived or departed the physical structure; and
transmitting the notice to a remote computer identifying when the device has entered or exited the physical structure.

5. The method of claim 1, further comprising:
detecting that a device, in route to the physical structure, is within a predetermined distance of the virtual geofence around the physical structure based on GPS data associated with the device;
generating a notice indicating that the device will be arriving at the physical structure based on detecting that the device is within the predetermined distance of the virtual geofence; and
transmitting the notice to a remote dispatcher prior to arrival at the physical structure.

6. The method of claim 1, wherein the geographic coordinate information includes longitude and latitude coordinates of the physical structure.

7. An apparatus executable by a network-based control computer, comprising:
a memory; and
a processor in communication with the memory and configured to:
receive, at the network-based control computer, global positioning system (GPS) data from a plurality of devices, wherein the GPS data is associated with a physical structure;
group the GPS data from the plurality of devices to generate GPS trajectory information for each group of the plurality of devices;
calculate kernel density estimation based on the GPS trajectory information;
determine an isoline on a virtual map for the each group of the plurality of devices based on the kernel density estimation;
overlay the isoline data on a geographic coordinate information of the physical structure;
generate a virtual geofence around the physical structure based in part on overlaying the isoline data to the geographic coordinate information of the physical structure; and
store, in a memory of the network-based control computer, geofence information for a facility based on the virtual geofence that is created around the physical structure,
wherein the physical structure is a warehouse, a shipping physical structure, or a physical location that includes access for vehicles.

8. The apparatus of claim 7, wherein the processor is further configured to:
identify a location of interest at the physical structure that is within the virtual geofence based on accumulation of the GPS data from the plurality of devices over a first period of time.

9. The apparatus of claim 8, wherein the processor is further configured to:
configure a GPS device to display the location of interest on a display screen.

10. The apparatus of claim 7, wherein the processor is further configured to:
generate a notice when a global positioning system (GPS) data associated with a device indicates that the device has either entered or exited the virtual geofence around the physical structure, wherein the notice includes a message indicating that the device has arrived or departed the physical structure; and
transmit the notice to a remote computer identifying when the device has entered or exited the physical structure.

11. The apparatus of claim 7, wherein the processor is further configured to:
detect that a device, in route to the physical structure, is within a predetermined distance of the virtual geofence around the physical structure based on GPS data associated with the device;
generate a notice indicating that the device will be arriving at the physical structure based on detecting that the device is within the predetermined distance of the virtual geofence; and
transmit the notice to a remote dispatcher prior to arrival at the physical structure.

12. The apparatus of claim 7, wherein the geographic coordinate information includes longitude and latitude coordinates of the physical structure.

13. An apparatus executable by a network-based control computer, comprising:
means for receiving, at the network-based control computer, global positioning system (GPS) data from a plurality of devices, wherein the GPS data is associated with a physical structure;
means for grouping the GPS data from the plurality of devices to generate GPS trajectory information for each group of the plurality of devices;
means for calculating kernel density estimation based on the GPS trajectory information;
means for determining an isoline on a virtual map for the each group of the plurality of devices based on the kernel density estimation;
means for overlaying the isoline data on a geographic coordinate information of the physical structure;
means for generating a virtual geofence around the physical structure based in part on overlaying the isoline data to the geographic coordinate information of the physical structure; and
means for storing, in a memory of the network-based control computer, geofence information for a facility based on the virtual geofence that is created around the physical structure,
wherein the physical structure is a warehouse, a shipping physical structure, or a physical location that include access for vehicles.

14. The apparatus of claim 13, further comprising:
means for identifying a location of interest at the physical structure that is within the virtual geofence based on accumulation of the GPS data from the plurality of devices over a first period of time.

15. The apparatus of claim 14, further comprising:
means for configuring a GPS device to display the location of interest on a display screen.

16. The apparatus of claim 13, further comprising:
means for generating a notice when a global positioning system (GPS) data associated with a device indicates that the device has either entered or exited the virtual geofence around the physical structure, wherein the notice includes a message indicating that the device has arrived or departed the physical structure; and
means for transmitting the notice to a remote computer identifying when the device has entered or exited the physical structure.

17. The apparatus of claim 13, further comprising:
means for detecting that a device, in route to the physical structure, is within a predetermined distance of the virtual geofence around the physical structure based on GPS data associated with the device;

means for generating a notice indicating that the device will be arriving at the physical structure based on detecting that the device is within the predetermined distance of the virtual geofence; and means for transmitting the notice to a remote dispatcher prior to arrival at the physical structure.

18. The apparatus of claim 13, wherein the geographic coordinate information includes longitude and latitude coordinates of the physical structure.

19. A non-transitory computer-readable medium comprising stored instructions, executable by a processor to:

receive, at a network-based control computer, global positioning system (GPS) data from a plurality of devices, wherein the GPS data is associated with a physical structure;

group the GPS data from the plurality of devices to generate GPS trajectory information for each group of the plurality of devices;

calculate kernel density estimation based on the GPS trajectory information; determine an isoline on a virtual map for the each group of the plurality of devices based on the kernel density estimation;

overlay the isoline data on a geographic coordinate information of the physical structure;

generate a virtual geofence around the physical structure based in part on overlaying the isoline data to the geographic coordinate information of the physical structure; and store, in a memory of the network-based control computer, geofence information for a facility based on the virtual geofence that is created around the physical structure, wherein the physical structure is a warehouse, a shipping physical structure, or a physical location that include access for vehicles.

* * * * *